March 26, 1940.                P. G. CAZES                    2,195,268
                  FILM MAGAZINE FOR CINEMATOGRAPHIC CAMERAS
                       Filed Jan. 14, 1937          2 Sheets-Sheet 1
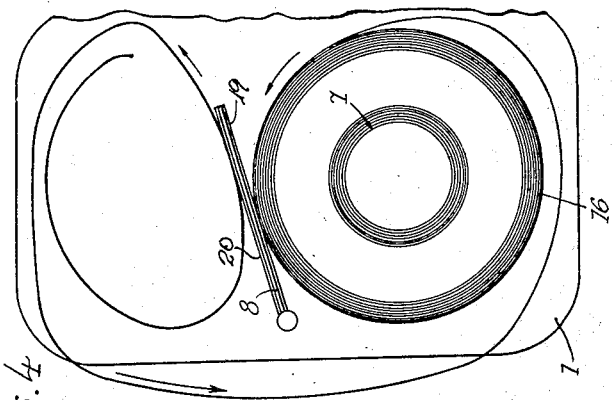
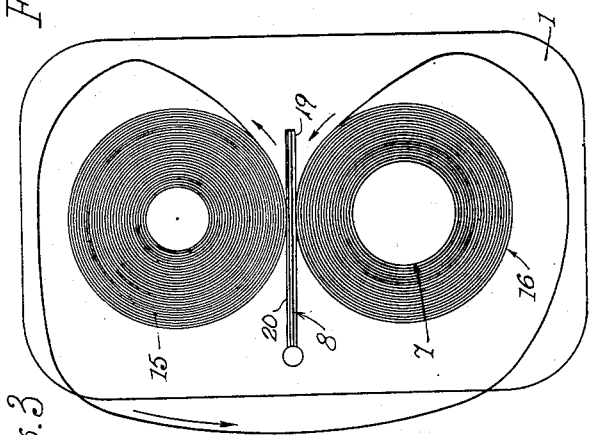
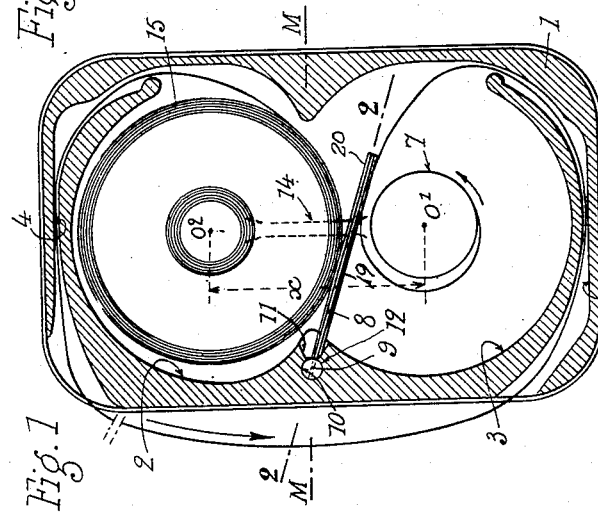
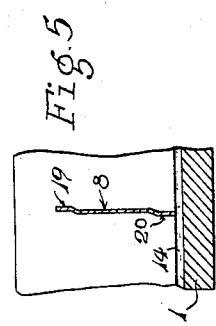
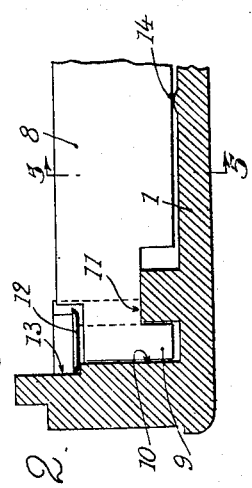
Paul Georges Cazes
INVENTOR
By
his ATTY.

March 26, 1940.    P. G. CAZES    2,195,268

FILM MAGAZINE FOR CINEMATOGRAPHIC CAMERAS

Filed Jan. 14, 1937    2 Sheets-Sheet 2

Paul Georges Cazes
INVENTOR

By
his ATTY.

Patented Mar. 26, 1940

2,195,268

UNITED STATES PATENT OFFICE 2,195,268

FILM MAGAZINE FOR CINEMATOGRAPHIC CAMERAS

Paul Georges Cazes, Paris, France, assignor to Pathé Cinéma, Anciens Établissements Pathé Freres, Paris (Seine), France Application January 14, 1937, Serial No. 120,495
In France July 17, 1936

7 Claims. (Cl. 242—71)

The film magazines containing the sensitive film for cinematographic cameras usually comprise two cavities or recesses. The unexposed film is unwound in one of these recesses, and after passing before the lens situated outside of the film magazine, it is wound in the other recess. In this manner, when the first recess is full, the second is empty, and inversely. In consequence, a considerable amount of space is lost to no avail.

The present invention relates to an improved film magazine of reduced size for cinematographic cameras. The said film magazine is chiefly characterized by the fact that on the one hand the distance between the centres of the two cavities or recesses is greater than the radius and less than the diameter of the complete roll of film, and on the other hand, by the use of a movable partition which is thin and has a polished surface, this being permanently interposed between the two rolls of film, whereof one is unwinding and the other is winding, thus preventing all direct contact between the two sensitized surfaces in movement.

Owing to this feature, the size of the film magazine is reduced, but without the serious drawback which would result from the contact between the supply roll of unexposed film which is unwinding, and the take-up roll of exposed film which is winding. Such contact would cause a continual friction between the unexposed film which is unwinding and the exposed film which is winding, and this friction would be greater from the fact that these two movements are in the contrary directions, and would be more pronounced in the case of new films. Aside from the danger of scratching which may result from the mutual friction of the two rolls, the two emulsion surfaces may adhere together and cause jamming of the film.

On the contrary, with the intermediate partition which is thin and has a polished surface, there will be no direct friction between the two rolls, thus eliminating the aforesaid drawbacks.

The intermediate movable partition preferably consists of a blade which is pivotally mounted in the film magazine on an axle adjacent one of the generatrices common to the two recesses, and whose mean position corresponds to the secant plane common to the said recesses.

In the accompanying drawings, which are given by way of example:

Fig. 1 is a plan view of a film magazine in accordance with the invention, with the cover removed, the film rolls being in the position of the commencement of the unwinding.

Fig. 2 is a section of the said magazine on the line 2—2 of Fig. 1, on a larger scale.

Fig. 3 is a diagrammatic view of the film magazine, with the film rolls in the half-unwound position.

Fig. 4 is another diagrammatic view of the magazine, the film rolls being now at the end of the unwinding.

Fig. 5 is a section of the partition on the line 5—5 of Fig. 2.

Figure 6:
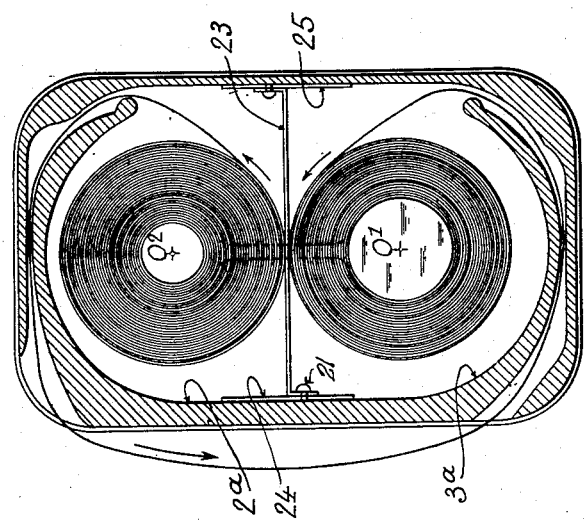
Fig. 6 shows diagrammatically a plan view of a modification.

In the embodiment herein represented, the film magazine consists of a box 1 to which is fitted, as usual, a cover which is not shown.

The box 1 may consist of a moulded piece, of any suitable material, such as Bakelite, moulded material, or the like.

The said box 1 comprises two recesses 2 and 3 (Fig. 1) of cylindrical shape, but the distance $x$ between the axes $O^1$ and $O^2$ is less than the sum of the radii of these recesses, so as to reduce to a minimum the size of the film magazine in its longitudinal direction.

The said recesses 2 and 3 comprise, in the known manner, the guideway 4 for the unwinding and the guideway 5 for the winding, respectively. The recess 3 further comprises a winding core 7 which is rotatable on its axis $O^1$ and serves to receive the film. The use of a core is not necessary in the recess 2.

A blade 8 of metal or other material, such as Bakelite, fibre or the like, which can be polished and has no action upon the emulsion, is pivotally mounted in the recesses 2 and 3 in such manner that in its mean position (Fig. 1) it will be secant to the two recesses.

The pivot mounting of the said blade consists, for example, of a lug 9 (Fig. 2) which is formed at the end of the blade by recessing said blade at 17. The lug 9 is engaged in a cylindrical cavity 10 formed in the lateral wall of said film magazine. The axis of said cavity is situated in the plane MM (Fig. 1) which is secant to the two recesses and is adjacent one of the generatrices of the intersection of the walls of the two recesses. The said cavity 10 communicates with the interior of the recesses by an aperture or notch 11 through which the said blade 8 passes. A raised portion 18 is formed in the box bottom and extends through slot 17. The said aperture 11 limits the oscillations of the blade 8. A washer 12, secured in a recess 13 formed in the film magazine above the end of the movable blade, serves to hold the latter in place.

A rib 14 is preferably formed in the bottom of the box in order to reduce to a minimum the friction of the said blade 8 during its oscillations.

The blade 8 may also carry ribs or film guides 19 and 20 as shown in Figs. 2 and 5 in order to reduce the surface of contact between the blade and the film.

The operation is as follows. The loading of the film magazine is very simply effected. The roll 15 of unexposed film is placed in the recess 2 and the film is attached to the core 7 of the recess 3 after threading it through the guideways 4 and 5; the blade 8 is now in its lower position, thus separating the two film rolls 15—16 (Fig. 1).

When the film is first unwound, the blade 8 is thus in its lower position (Fig. 1), and it is then gradually raised by the action of the take-up roll 16 whose diameter increases. The supply roll 15 expands, and its spirals spread apart.

Thus the blade 8, which is constantly tangent to the upper roll 15 and to the lower roll 16, serves as a movable partition and prevents all direct friction and all catching between the two rolls.

The upper and lower film rolls which thus guide the said blade between them during the whole of its movement, will keep it perpendicular to the end wall of the film magazine, thus preventing it from falling down and thus from jamming its axle 9 in the cavity 10.

Obviously, the said invention is not limited to the embodiment herein described and represented, which is given solely by way of example.

The separating partition 23 might also be secured at its ends as shown in Fig. 6 at 21 to two sliding members 24 and 25 adapted to slide on the walls of the recesses 2ª and 3ª in a direction parallel to a line passing through the axes 0¹ and 0² of the two recesses 2ª and 3ª. In the case of oscillation, the pivot mounting and the securing might be different from what has been above indicated.

Having now described my invention what I claim as new and desire to secure by Letters Patent is:

1. A film magazine comprising a box provided with a supply recess adapted to contain a roll of film before exposure and a take-up recess adapted to contain the same roll of film after exposure, a rotatable core in the centre of said take-up recess on which one end of said roll of film is adapted to be attached, and a movable partition situated between the centres of said recesses, the distance between the centres of said recesses being substantially equal to the sum of the radii of the two halves of said roll when said roll is partly unwound from one recess and partly wound in the other recess augmented by the thickness of said partition, whereby said partition is adapted to bear directly and tangentially with one face on the outer turn of the part of the roll of film contained in the supply recess and with its opposite face on the outer turn of the part of the roll of film contained in the take-up recess and to be displaced substantially towards and away from each centre of said recesses, so as to avoid direct contact between said outer turns of said two parts of the roll of film.

2. A film magazine according to claim 1, comprising further a pivot rotatably mounted between said recesses at a distance from each centre of said recesses greater than the radius of a complete roll of film, said partition being secured on said pivot.

3. A film magazine according to claim 1, in which said box is provided with a hole at a distance from each centre of said recesses greater than the radius of a complete roll of film, said hole communicating with said recesses by a notch, and said partition is provided with an extension extending through said notch and with a pivot adapted to rotate in said hole, whereby the movements of said partition are limited by the opposite walls of said notch.

4. A film magazine according to claim 1, in which said box is provided with a hole at a distance from each centre of said recesses greater than the radius of a complete roll of film, the upper part of said hole communicating with said recesses by a notch, and said partition is formed by a blade provided near one end with a cut out part adapted to be inserted into said notch and leaving at the end of the blade a portion adapted to be engaged into said hole, whereby said blade is adapted to rotate about the axis of said hole and to be limited in its displacements by the opposite walls of said notch.

5. A film magazine according to claim 1, comprising further at least one rib provided on the bottom of said box and on which the lower edge of said partition is adapted to bear.

6. A film magazine according to claim 1, comprising further at least one rib on any one of the faces of said partition and on which said film is adapted to bear.

7. A film magazine according to claim 1, comprising further at least one rib on both faces of said partition and on which said film is adapted to bear.

PAUL GEORGES CAZES.